D. G. GALBRAITH.
ROLLER BEARING.
APPLICATION FILED JULY 27, 1916.

1,210,632.

Patented Jan. 2, 1917.

Inventor,
David G. Galbraith

UNITED STATES PATENT OFFICE.

DAVID G. GALBRAITH, OF MINERAL WELLS, TEXAS, ASSIGNOR TO ANN-LOCK MERIWETHER, OF TULSA, OKLAHOMA, AND DAVID GLADYS GALBRAITH, ESTHER AMANDA GALBRAITH, AND MARY ELIZABETH GALBRAITH, ALL OF MINERAL WELLS, TEXAS.

ROLLER-BEARING.

1,210,632.  Specification of Letters Patent.  Patented Jan. 2, 1917.

Application filed July 27, 1916. Serial No. 111,665.

*To all whom it may concern:*

Be it known that I, DAVID G. GALBRAITH, a citizen of the United States, residing at Mineral Wells, in the county of Palo Pinto and State of Texas, have invented a new and useful Roller-Bearing, of which the following is a specification.

My invention relates to improvements in roller bearings in which annular adjusting tracks are secured to the axle or shaft by means of adjustment and act in conjunction with a race in the hub or box to provide means for holding the hub or box on the axle or shaft with roller contact throughout, in a plurality of carrying and separating conical or cylindrical rollers having beveled ends. The separating rollers make contact on the annular track and provide means for taking up all wear by means of adjustments which hold flexible dust-proof disks or washers in place. I attain these objects by the mechanism illustrated in the accompanying drawing, in which:—

Figure 1:
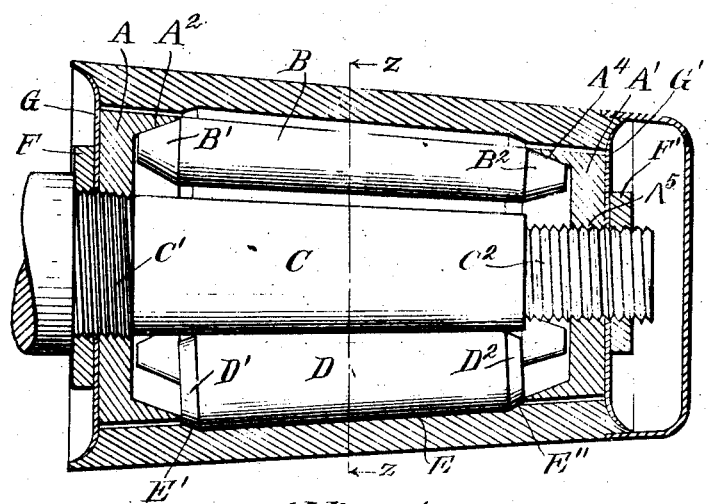
Figure 2:
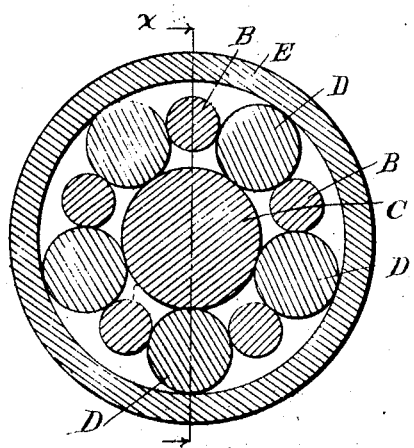

Figure 1 is a detailed sectional view as given by line x—x in Fig. 2, showing the adjusting track and means of adjustment in conjunction with race in hub or box and dust-excluding disks or washers. Fig. 2 is a vertical view as given at line z—z in Fig. 1, showing the relative contact with hub and axle or box and shaft with carrying rollers and separating rollers.

Similar letters refer to similar parts throughout the views.

In the drawing, the bearing consists of an outer casing E, and a shaft or axle C, having interposed therebetween load-carrying rollers D, D, and idler or spacing rollers B, B. The internal surface of the casing E, is provided with a bearing surface having beveled portions, E', E'', co-acting with the beveled end portions $D^1$, $D^2$, of the load-carrying rollers D.

The shaft or axle C, is provided at each end with screw-threaded portions $C^1$, $C^2$, which adjustably receive the cup-shaped track members, A, A', which are provided with longitudinally extending flanges, having beveled surfaces $A^2$, $A^4$, which coact with the beveled ends $B^1$, $B^2$ of the spacing rollers B, B. Mounted on the axle C and secured between A, A' and the lock nut F, F' respectively, are the flexible dust-excluding disks or washers G, G', which engage the outer edges of the casing E.

I claim—

A roller bearing comprising an outer casing having an interior bearing surface, an axle having an extended bearing surface thereon, load-carrying rollers interposed between the casing and the axle and contacting therewith, track members adjustably mounted on the axle, having beveled flange portions, spacing rollers alternating with the load carrying rollers and having beveled ends bearing on the beveled flange portion of the adjustable track members, and flexible disk washers secured to the axle by means of lock nuts substantially as described.

DAVID G. GALBRAITH.